No Printed Specification Available
8631X
J. Eames.
Theodolite.
Patented Feb. 11, 1835.
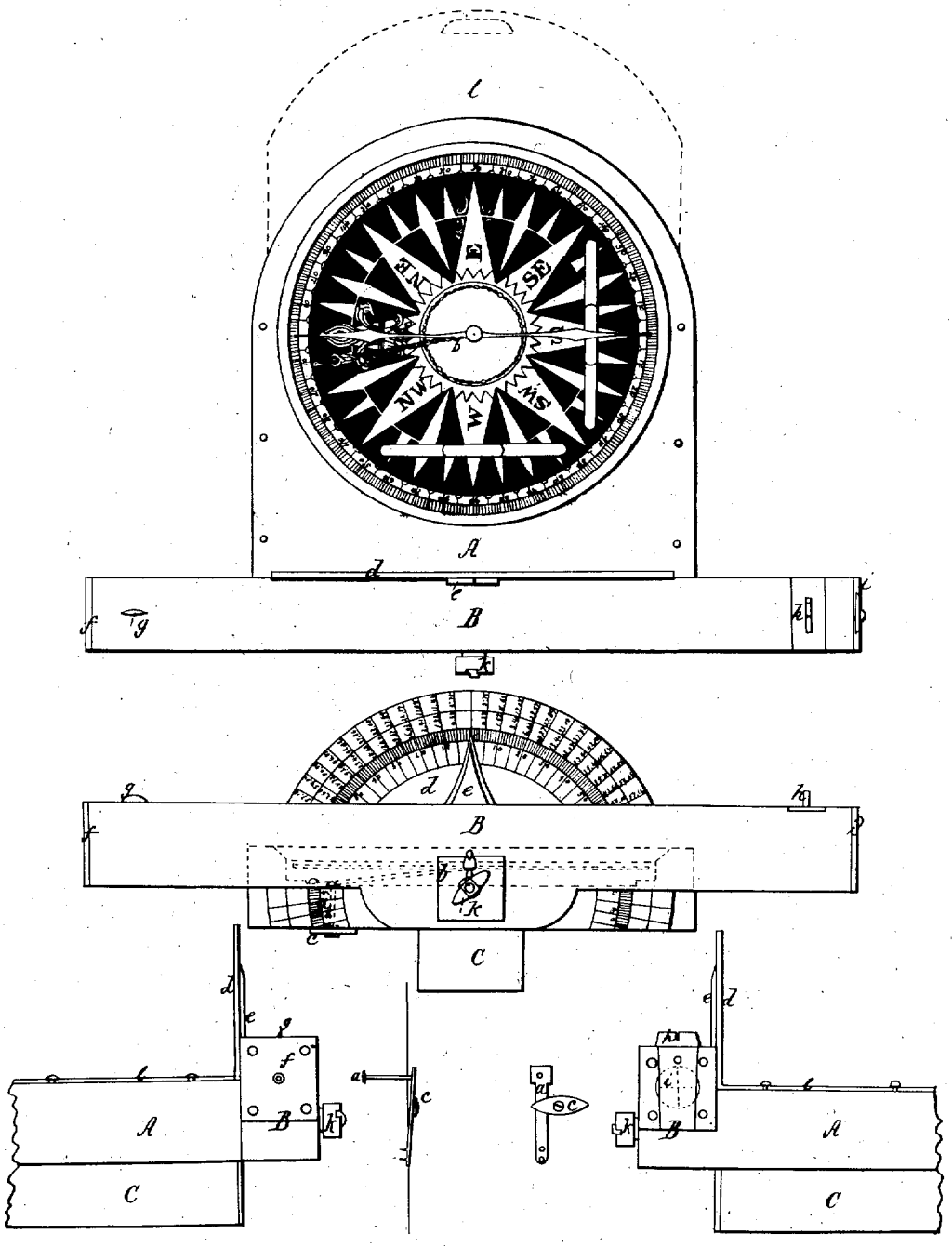

[illegible]

Feb 11. 1835 353

James Eames of Newry, Maine 8631X

Letters Patent

The schedule referred to in these Letters Patent, and making part of the same containing a description in the words of the said James Eames himself of his improvement in the Theodolite or Surveyors Compass —

---

To all to whom these presents shall come; Be it known that I James Eames, of Newry, in the County of Oxford, and State of Maine, have invented a new & useful Theodolite or Surveyors compass, and that the following is a full & exact description thereof: composed of several instruments now in use, brought together in my new invented way and manner, viz: First, I take the surveyors circumferenter without the usual index, and form the outside of the box, so as to preserve one side straight parallel with the north & South line under the needle on the card — Secondly, I take the protractor, adding two lines, one to show the sag of chain, the other the rise & fall of uneven lands, and attach it to the straight side of the compass, so as to hang perpendicular —

Thirdly I take the tube on index with prospect glasses inside of said tube, and attach it to the compass, on the outside of the protractor in such a manner as to move round like the index of the theodolite when placed for taking heights and so forth, having placed & levelled my compass, I can raise my tube, so as to descry the object, then by casting my eye on the protractor, where the first end of the tube intersects the lines on the protractor, I see not only, the degrees, but also the sag of the chaine and also the rise of land for a certain distance. In descending ground, by lowering my tube, taking my object, and casting my eye upon the protractor directly under the further end of the tube where it intersects the lines of the protractor, and the degree, sag of chaine, and descent of ground is seen. —

What I claim as my own invention, and not previously known, in the above described machine, is, in bringing the several instruments together, in my new invented way, as before described —

Witnesses

O'Neil W Robinson

O'Neil W. Robinson Jr.

James Eames

Exd

[illegible]

( Patented Feb. 11. 1835. )

( [illegible] )